(12) United States Patent
Yoneda et al.

(10) Patent No.: US 8,435,413 B2
(45) Date of Patent: May 7, 2013

(54) METHOD FOR CONTROLLING A WASTE WATER CONCENTRATION OF CLEANING SOLUTION CONTAINING PHOSPHORUS

(75) Inventors: Satoshi Yoneda, Tokyo (JP); Takahiro Sugano, Tokyo (JP); Nobuyuki Sato, Tokyo (JP)

(73) Assignee: JFE Steel Corporation (JP)

(*) Notice: Subject to any disclaimer, the term of this patent is extended or adjusted under 35 U.S.C. 154(b) by 544 days.

(21) Appl. No.: 12/667,270

(22) PCT Filed: Jul. 24, 2008

(86) PCT No.: PCT/JP2008/063711
§ 371 (c)(1),
(2), (4) Date: Dec. 30, 2009

(87) PCT Pub. No.: WO2009/017178
PCT Pub. Date: Feb. 5, 2009

(65) Prior Publication Data
US 2010/0181259 A1    Jul. 22, 2010

(30) Foreign Application Priority Data

Jul. 30, 2007   (JP) .................................. 2007-197268

(51) Int. Cl.
*G01N 33/18*   (2006.01)
*C02F 1/00*   (2006.01)

(52) U.S. Cl.
USPC ........... 210/739; 210/749; 210/754; 210/906; 210/907

(58) Field of Classification Search ................. 210/96.1, 210/709, 739, 749, 906, 907, 754; 436/103; 451/36, 40, 60, 446
See application file for complete search history.

(56) References Cited

U.S. PATENT DOCUMENTS

| | | | |
|---|---|---|---|
| 5,589,068 | A | 12/1996 | Nielsen |
| 6,303,027 | B1 | 10/2001 | Nagaiwa et al. |

FOREIGN PATENT DOCUMENTS

| | | |
|---|---|---|
| DE | 199 21 135 A1 | 11/2000 |
| JP | 50-033132 A | 3/1975 |

(Continued)

OTHER PUBLICATIONS

Complete Machine Translation of JP 2000-176434 A.*

(Continued)

*Primary Examiner* — Duane Smith
*Assistant Examiner* — Paul J Durand
(74) *Attorney, Agent, or Firm* — DLA Piper LLP (US)

(57) ABSTRACT

A method of controlling the concentration of P of cleaning solution waste water starts by providing a waste water buffer tank capable of either sending the waste water to a waste water treatment plant or storing the waste water after the waste water is accepted. The concentration of P in the cleaning solution is set within a target concentration range, and matter to be treated is treated. The concentration of P in the waste water is measured in the waste water buffer tank. When the measured value of the concentration of P is less than a selected upper limit, the waste water is sent from the waste water buffer tank to the waste water treatment plant. When the measured value of the concentration of P is higher than the selected upper limit, sending the waste water to the waste water treatment plant is stopped, and the waste water is stored in the waste water buffer tank. The concentration of P is reduced to a value within the target concentration range, and the matter to be treated is treated.

3 Claims, 2 Drawing Sheets

FOREIGN PATENT DOCUMENTS

| | | |
|---|---|---|
| JP | 7-268659 A | 10/1995 |
| JP | 2000-176434 A | 6/2000 |
| JP | 2000176434 A * | 6/2000 |
| JP | 2001-049413 A | 2/2001 |
| JP | 2002-200494 A | 7/2002 |
| JP | 2003-033771 A | 2/2003 |
| JP | 2006-169572 A | 6/2006 |
| JP | 2006169572 A * | 6/2006 |
| JP | 2007-092093 A | 4/2007 |
| WO | 2005/049890 A1 | 6/2005 |

OTHER PUBLICATIONS

Complete Machine Translation of JP 2006-169572 A.*

* cited by examiner

METHOD FOR CONTROLLING A WASTE WATER CONCENTRATION OF CLEANING SOLUTION CONTAINING PHOSPHORUS

RELATED APPLICATIONS

This is a §371 of International Application No. PCT/JP2008/063711, with an international filing date of Jul. 24, 2008 (WO 2009/017178 A1, published Feb. 5, 2009), which is based on Japanese Patent Application No. 2007-197268, filed Jul. 30, 2007, the subject matter of which is incorporated by reference.

TECHNICAL FIELD

This disclosure relates to a method for controlling the concentration of P (phosphorus) in cleaning solution waste water.

BACKGROUND

The processing steps for fabricating steel products generate various kinds of waste waters that are discharged. Hazardous substances may be contained in those waste waters if they remain untreated. Waste water containing hazardous substances are sent from various processing steps to a waste water treatment process. In a waste water treatment plant, the waste water is neutralized, sedimented, and otherwise treated, and hazardous components are treated as refractory substances and separated by sedimentation (see JP-A-7-268659 and JP-A-2002-200494).

For example, a surface treatment or activating process is performed as a post treatment of a galvanizing process in a hot-dip galvanizing line. In the surface treatment, galvanized steel sheets are rinsed with a surface treatment liquid containing P after a cleaning process (see, for example, JP-A-2007-92093). Since the surface treatment liquid and the waste water from the rinsing water contain a P component of the surface treatment or activating process, it is impossible to drain out them directly. Therefore, waste water from a surface treatment or activating process is drained to a drainage pit within the galvanizing line. The waste water is sent from the drainage pit to a waste water treatment plant, where the waste water is neutralized, sedimented and otherwise treated. The waste water is sedimented and separated while treating the P component as a refractory substance.

However, if the P concentration of the waste water sent to the waste water treatment plant is high, it is impossible to neutralize, sediment and otherwise treat the waste water in the waste water treatment plant. Consequently, an upper limit of the P concentration of the waste water that can be sent into the waste water treatment plant is established. It is necessary to immediately stop sending of the waste water into the waste water treatment plant if the P concentration of the waste water from the drainage pit exceeds the upper limit of P concentration. If the flow of waste water into the waste water treatment plant is stopped, operation of the galvanizing line is typically stopped.

It is therefore customary to employ a waste water buffer tank capable of storing the waste water to prevent operation of the hot-dip galvanizing line from being stopped when waste water exceeding the upper limit of P concentration is produced. Feeding the waste water into the waste water treatment plant is stopped when the P concentration of the waste water exceeds the upper limit of P concentration. The waste water is then stored in the waste water buffer tank.

However, if the operation is run after stopping the flow of waste water into the waste water treatment plant, the operation can run only for a short time until the waste water buffer tank becomes full.

It is also possible to dilute the waste water by adding diluting water into a waste water buffer tank such that the P concentration of the waste water becomes lower than the upper limit of P concentration such that the waste water can be sent to a waste water treatment plant. The thus diluted waste water can be sent to the waste water treatment plant. However, this method has the problem that the amount of waste water increases.

It could therefore be helpful to provide a method for controlling the concentration of P in cleaning solution waste water in such a way that sending waste water with high P concentrations and large amounts of waste water containing P into a waste water treatment plant can be prevented. This can assist in avoiding interrupting the operation of the galvanizing line.

SUMMARY

We thus provide a method for controlling the concentration of P in cleaning solution waste water, the method comprising the steps of:
providing a waste water buffer tank which, after receiving waste water of the cleaning solution containing P, can send the waste water to a waste water treatment plant or store the waste water;
treating matter to be treated while setting the concentration of the cleaning solution containing P within a target concentration range;
measuring the concentration of P in the waste water of the cleaning solution in the waste water buffer tank;
sending the waste water of the cleaning solution containing P from the waste water buffer tank to the waste water treatment plant when the measured value of the P concentration is less than a tolerable upper limit; and
stopping the flow of the waste water of the cleaning solution containing P to the waste water treatment plant, storing the waste water in the waste water buffer tank, and treating the matter to be treated while reducing the concentration of the cleaning solution containing P to a value within the target concentration range when the measured value of the P concentration is higher than the tolerable upper limit.

We also provide a method for controlling the concentration of P in cleaning solution waste water.

In the above-described method for controlling concentration of P in the waste water, if the measured value of the concentration of P in the waste water stored in the waste water buffer tank becomes less than the tolerable upper limit, it is desired to send the waste water to the waste water treatment plant from the waste water buffer tank.

Furthermore, in the above-described method, when sending the waste water from the waste water buffer tank to the waste water treatment plant is begun, it is desired to increase the P concentration to a value within the target range.

When the concentration of P in the cleaning solution waste water has reached the tolerable upper limit, the concentration of P can be reduced to below the tolerable upper limit by reducing the concentration of P to a target lower limit. Therefore, it is possible to prevent waste water having high P concentrations and large amounts of waste water containing P from being sent to the waste water treatment plant while continuing the operation.

Figure 1:
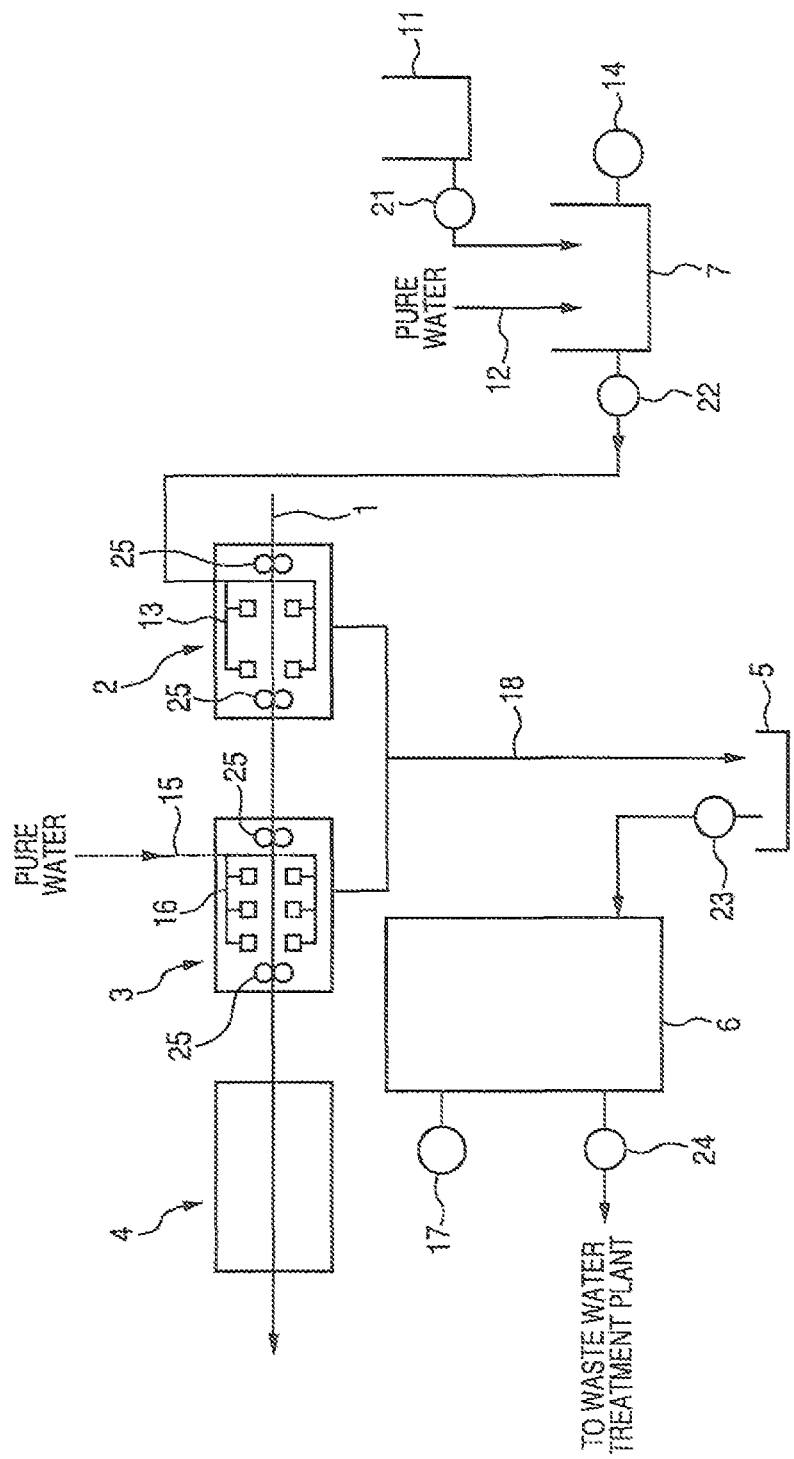
FIG. 1 is a schematic diagram illustrating a surface treatment or activating process in a production process for fabricating hot-dip galvanized steel sheets.

Symbols described in FIG. 1 are as follows:
- 1: hot-dip galvanized steel sheet;
- 2: surface treatment or activating apparatus;
- 3: rinsing apparatus;
- 4: drier;
- 5: drainage pit;
- 6: waste water buffer tank;
- 7: surface treatment tank;
- 11: surface treatment stock solution supply tank;
- 12, 15: pure water supply tubes;
- 13, 16: sprayers;
- 14, 17: P concentration meters;
- 18: drain tube;
- 21-24: pumps;
- 25: wringer roll

DETAILED DESCRIPTION

Our methods are described taking a surface treatment or activating step as an example, the surface treatment or activating step being performed after a hot-dip galvanizing step on a hot-dip galvanizing line. The surface treatment or activating step is performed to improve the press moldability at a customer's site.

FIG. 1 is a schematic diagram illustrating the surface treatment or activating step on the hot-dip galvanizing line. In FIG. 1, there is shown a steel sheet (hot-dip galvanized steel sheet) 1, a surface treatment or activating apparatus 2, a rinsing apparatus 3, a drier 4, a drainage pit 5, a waste water buffer tank 6, and a surface treatment tank 7.

The surface treatment tank 7 holds a surface treatment or activating liquid containing P. With respect to the concentration of P of the surface treatment or activating liquid, a target concentration median $C_M$, a target upper limit value $C_U$, and a target lower limit value $C_L$ are set, taking account of the quality of the galvanized steel sheet, operability, and so on. The target upper limit value $C_U$ and target lower limit value $C_L$ are set to concentrations at which the operation and quality present no problems if a concentration within the range is adopted as a P concentration-set value (described later) of the surface treatment or activating liquid. $C_U$ to $C_L$ give the target concentration range.

The surface treatment tank 7 has a surface treatment stock solution supply tank 11 that stores the surface treatment liquid stock solution in the surface treatment tank 7, a pure water supply tube 12 that supplies pure water, a P concentration meter 14, and a liquid level meter (not shown) that detects the liquid level, controls the concentration of the surface treatment or activating liquid, and controls the liquid level.

The liquid level control is provided as follows. Two kinds of liquid level, or a low liquid level and a high liquid level, are set. When the liquid level becomes the low liquid level, pure water is supplied. When the liquid level becomes the high liquid level, the supply of pure water is stopped. Thus, the liquid level is kept roughly between the low and high liquid levels.

With respect to the concentration control, when the concentration of P measured by the P concentration meter 14 is less than the set value of the concentration of P (this concentration is referred to as the set value of P concentration) of the controlled surface treatment liquid, the surface treatment liquid stock solution is supplied from the surface treatment stock solution supply tank 11, based on the difference between the set value of P concentration and the measured value of P concentration such that the P concentration in the surface treatment tank 7 becomes the set value of P concentration. In normal operation, the target concentration median $C_M$ is adopted as the set value of P concentration of the surface treatment or activating liquid.

The surface treatment or activating apparatus 2 sprays the surface treatment liquid containing P received in the surface treatment tank 7, using a pump 22, from a sprayer 13 to the steel sheet 1, and squeezes out the surface treatment liquid by the wringer roll 25 located at the exit. Then, the steel sheet 1 exiting from the surface treatment or activating apparatus 2 is introduced into the rinsing apparatus 3. The rinsing apparatus 3 sprays the pure water supplied from the pure water supply tube 15 to the steel sheet 1 from a sprayer 16. The water is squeezed out by the wringer roll 25 located at the exit. The steel sheet 1 is made to exit from the rinsing apparatus 3 and dried by the drier 4. Then, the sheet is wound up by a winder on the exit side.

The surface treatment liquid containing P and supplied to the surface treatment or activating apparatus 2 and the rinsing water from the rinsing apparatus 3 flow into the drainage pit 5 through the drain tubes 18 connected, respectively, with lower portions of the apparatuses. The waste water from the drainage pit 5 is sent to the waste water buffer tank 6.

The drainage pit 5 is equipped with a pump 23 that sends the waste water to a waste water buffer tank 6 and with a liquid level meter (not shown) that detects the liquid level of the waste water. When the liquid level of the waste water becomes the preset high liquid level, the pump 23 sends the waste water to the waste water buffer tank 6. When the level becomes the preset low liquid level, the pump 23 is stopped.

The waste water buffer tank 6 receives waste water from the drainage pit 5 and sends the waste water to a waste water treatment plant or stores the water in the waste water buffer tank 6. The waste water buffer tank 6 is made larger in capacity than the drainage pit 5. The tank capacity is appropriately determined taking account of the amount of stored waste water. The upper limit (hereinafter referred to as the "tolerable upper limit") of the concentration of P that can be sent from the waste water buffer tank 6 to the waste water treatment plant has been determined previously.

The waste water buffer tank 6 has a pump 24 that sends the waste water to the waste water treatment plant, a P concentration meter 17 that detects the concentration of P in the waste water in the waste water buffer tank 6, and a liquid level meter (not shown) that detects the liquid level of the waste water. With respect to the liquid level, a low liquid level 1 used when the waste water is sent to the waste water treatment plant, a low liquid level 2 (the low liquid level 1 is lower than the low liquid level 2), and a maximum liquid level (limit liquid level of the stored liquid) are set. Making the positions of the low liquid level 1 and low liquid level 2 as low as possible compared with the position of the maximum liquid level is advantageous in increasing the amount of the liquid stored in the waste water buffer tank 6.

The waste water buffer tank 6 measures the concentration of P in the waste water with the P concentration meter 17, and sends the waste water to the waste water treatment plant with the pump 24 when the measured value of the concentration of P is lower than the tolerable upper limit. When the waste water is sent to the waste water treatment plant, if the liquid level of the waste water becomes the low liquid level 2, the pump 24 engages. The pump 24 is stopped if the level becomes the low liquid level 1.

When the concentration of P measured by the P concentration meter 17 is higher than the tolerable upper limit, the pump 24 is stopped and the flow of waste water to the waste water treatment plant is stopped. The waste water is stored in the waste water buffer tank 6.

If the processing described above is performed, the liquid level of the surface treatment liquid in the surface treatment tank 7 drops and the following control of the liquid level and control of the concentration are carried out. Pure water is supplied from the pure water supply tube 12 when the liquid level becomes a low liquid level. The flow of pure water is stopped when the liquid level becomes a high liquid level. The concentration of P of the surface treatment liquid drops, because of the supply of pure water. Then, the surface treatment liquid stock solution is supplied from the surface treatment stock solution supply tank 11. The surface treatment liquid stock solution containing a high concentration of P is supplied from the surface treatment liquid stock solution supply tank 11 using the pump 21 according to the difference between the measured value of the concentration of P measured by the P concentration meter 14 and the set value of the concentration of P. Control is provided such that the concentration of P in the surface treatment tank 7 becomes the preset value of concentration of P.

When this control is performed with the surface treatment tank 7, the P concentration becomes higher when the surface treatment liquid stock solution is supplied. The P concentration of the waste water sent to the waste water buffer tank 6 increases correspondingly when the P concentration in the surface treatment tank 7 becomes high.

The pump 24 is stopped when the concentration of P in the waste water buffer tank 6 measured by the P concentration meter 17 becomes higher than the tolerable upper limit. The flow of water to the waste water treatment plant is stopped. The waste water is stored in the waste water buffer tank 6.

At the same time, the set value of the concentration of P in the surface treatment tank 7 is modified and reduced to a value within the target concentration range. Preferably, the P concentration is set to the target lower limit value $C_L$. The P concentration of the waste water flowing into the waste water buffer tank 6 immediately diluted with pure water is reduced to below the tolerable upper limit by reducing the set value of P concentration in the surface treatment tank 7 (preferably, by modifying the target lower limit value $C_L$).

The waste water which is stored in the waste water buffer tank 6 and has a concentration of P exceeding the tolerable concentration is diluted with newly pumped waste water having a concentration of P less than the tolerable upper limit. The pump 24 engages if the P concentration measured by the P concentration meter 17 in the waste water buffer tank 6 becomes lower than the tolerable upper limit. The waste water stored in the waste water buffer tank 6 is sent to the waste water treatment plant. The pump 24 is stopped when the liquid level drops to the low liquid level 1. Subsequently, the waste water flows to the waste water treatment plant by a normal method of disposing of waste water, i.e., the pump 24 engages at the low liquid level 2 and the pump 24 is stopped at the low liquid level 1.

When the concentration of P in the waste water buffer tank 6 measured by the P concentration meter 17 becomes lower than the tolerable upper limit and the operation of the pump 24 in the waste water buffer tank 6 is resumed, the set value of P concentration in the surface treatment tank 7 is modified and increased to a value within the target concentration range from the target lower limit value $C_U$. Preferably, the value is set to the original target concentration median $C_M$.

By performing steps as described above, sending waste water having high concentrations of P and large amounts of waste water containing P to the waste water treatment plant can be prevented while continuing upstream operations. If the amount of waste water from the waste water buffer tank 6 reaches the maximum liquid level before the P concentration measured by the P concentration meter 17 becomes lower than the tolerable upper limit, the upstream operation is stopped and disposal of the waste water from the surface treatment step is stopped.

The method can be used to control the concentration of P in waste water of general cleaning solution containing P, as well as of waste water produced from the above-described processing steps and containing P.

EXAMPLE

In the surface treatment step on the hot-dip galvanizing line shown in FIG. 1, the processing was done under the following conditions. The upper limit (tolerable upper limit) of the concentration of P in the waste water that can be sent to the waste water treatment plant is 6 mass ppm.

(1) Surface Treatment or Activating Apparatus
P concentration of surface treatment liquid: 10 mass ppm (target concentration median)
±5 mass ppm (target range) Target lower limit value $C_L$: 5 mass ppm
Flow rate of surface treatment liquid: 5 m³/Hr
(2) Rinsing Apparatus
Flow rate of pure water: 5 m³/Hr
(3) Waste Water Buffer Tank
Capacity: 100 m³
The tank capacity of 100 m³ is a capacity permitting about 10-hour operation taking account of processing of materials requiring surface treatment and materials not requiring surface treatment.

When the surface treatment step is performed while the value of the concentration of P in the surface treatment tank 7 is set to 10 mass ppm (target concentration median), if the concentration of P in the waste water buffer tank 6 increases and becomes equal to the tolerable upper limit of the waste buffer tank 6, i.e., 6 mass ppm, the flow of waste water to the waste water treatment plant is stopped and the waste water is stored in the waste water buffer tank 6. At the same time, the set value of the concentration of P in the surface treatment tank 7 is modified from 10 mass ppm to 5 mass ppm (target lower limit value).

Figure 2:
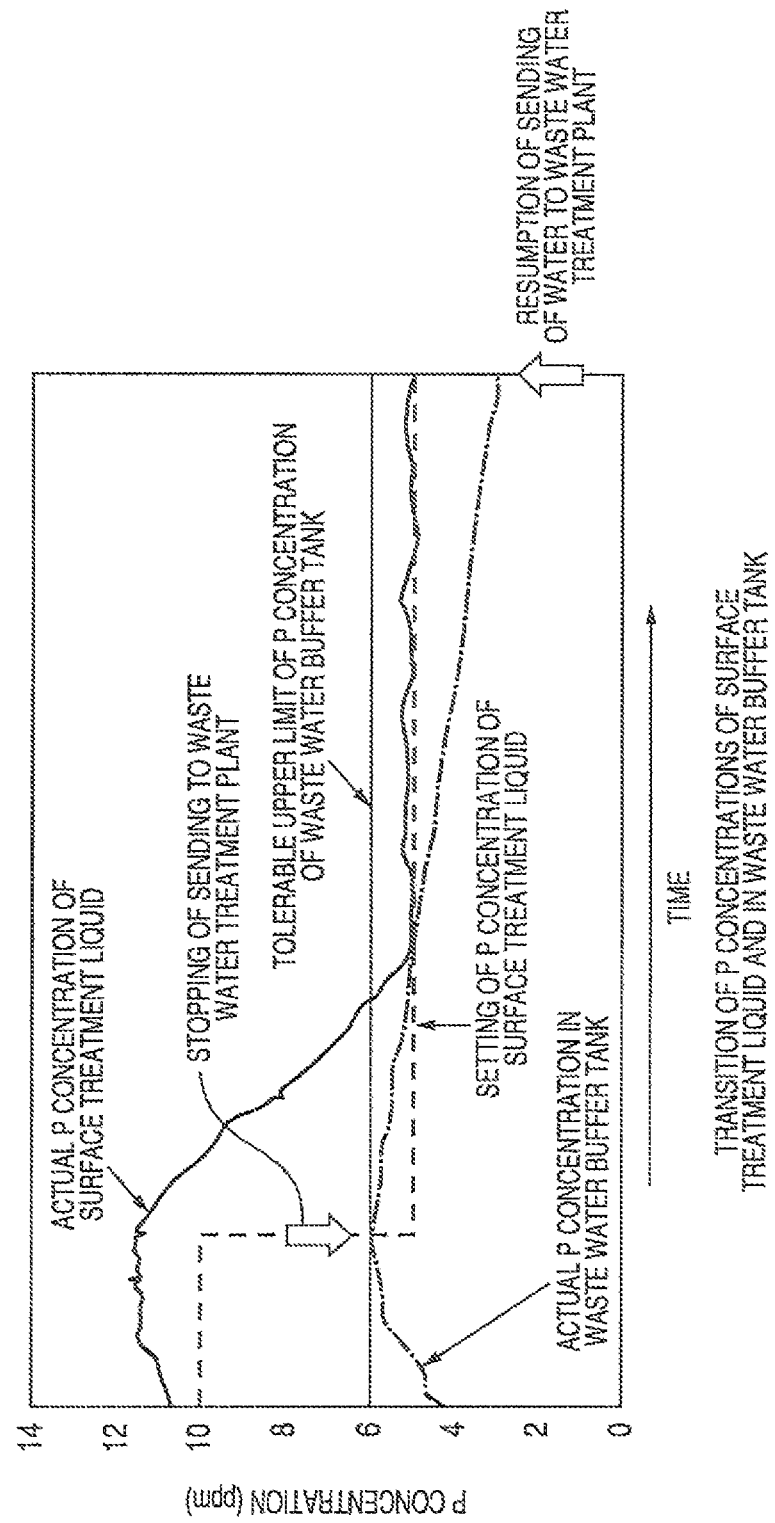
FIG. 2 is a diagram illustrating transition of the P concentration of waste water according to our method.

FIG. 2 shows one example of transition of set values of the concentration of P of the surface treatment liquid in the surface treatment tank 7, concentration of P measured by the P concentration meter, and concentration of P measured by the P concentration meter in the waste water buffer tank 6 before and after the set value of the concentration of P in the surface treatment tank 7 was modified from 10 mass ppm to 5 mass ppm. The target value (concentration preferable for disposal of waste water) of the concentration of P in the waste water buffer tank 6 in the present embodiment is 3 mass ppm.

Because the set value of concentration of P in the surface treatment tank 7 was modified from 10 mass ppm to 5 mass ppm, the concentration of P in the waste water buffer tank 6 decreased from 6 mass ppm to 3 mass ppm. At the instant when the concentration of P in the waste water buffer tank 6 dropped to 3 mass ppm, the flow of waste water to the waste water treatment plant was resumed. During this interval, the liquid level of the waste water in the waste water buffer tank was lower than the maximum liquid level. The operation was continued without stopping the line.

The P concentration in the waste water buffer tank 6 increased to 6 mass ppm under the condition where the set value of the concentration of P in the surface treatment tank 7 was 10 mass ppm, for the following reason. The liquid level in the surface treatment tank 7 dropped and pure water was supplied. Then, the surface treatment liquid stock solution was supplied from the surface treatment stock solution supply tank 11, increasing the concentration of P.

INDUSTRIAL APPLICABILITY

Our methods can be used to control the concentration of P in waste water in such a way that the flow of waste water having high P concentrations and large amounts of waste water containing P to a waste water treatment plant can be prevented when matter to be treated is treated using a cleaning solution containing P. This can assist in avoiding interrupting operation of the galvanizing line.

What is claimed is:

1. A method for controlling the concentration of phosphorus (P) in cleaning solution waste water comprising:
    providing a waste water buffer tank which, after receiving cleaning solution waste water containing P obtained from a treatment liquid containing P, sends the waste water to a waste water treatment plant or stores the waste water;
    setting upper and lower liquid levels of the cleaning solution waste water in the waste water buffer tank and setting the concentration of P in the cleaning solution waste water within a target concentration range;
    measuring the concentration of P in the cleaning solution waste water containing P in the waste water buffer tank;
    sending the cleaning solution waste water containing P from the waste water buffer tank to the waste water treatment plant when the measured value of the P concentration is less than a selected upper limit;
    stopping flow of the cleaning solution waste water containing P to the waste water treatment plant when the concentration of P is higher than the selected upper limit;
    storing the waste water in the waste water buffer tank; and
    controlling the liquid level of cleaning solution waste water in the waste water buffer tank while reducing the concentration of P in the cleaning solution waste water in the waste water buffer tank to a value within the target concentration range when the measured value of the P concentration of the cleaning solution waste water is higher than the selected upper limit by reducing a set value of a concentration of P in the treatment liquid containing P.

2. The method according to claim 1,
    wherein, when the measured value of the concentration of P in the cleaning solution waste water stored in the waste water buffer tank becomes less than the selected upper limit, the waste water cleaning solution is sent from the waste water buffer tank to the waste water treatment plant.

3. The method according to claim 2,
    wherein, if sending the waste water cleaning solution from the waste water buffer tank to the waste water treatment plant is started, the concentration of P is increased to a value within the target range.

* * * * *